Sept. 24, 1957     S. B. APPLEBAUM     2,807,582
METHOD AND APPARATUS FOR WATER TREATMENT
Filed April 5, 1954     2 Sheets-Sheet 1

|  | (1) | (2) After 48% $H_2Z$ 52% $Na_2Z$ | (3) After Decarb | (4) After Anion | (5) After Acid | (6) 10 conc. Boiler Saline |
|---|---|---|---|---|---|---|
|  | Raw |  |  |  |  |  |
| Ca as $CaCO_3$ | 110 | 0-1 |  | 0-1 | 0-1 |  |
| Mg " " | 94 | 0-1 |  | 0-1 | 0-1 |  |
| Na " " | 31 | 128 |  | 128 | 128 |  |
| Total cations | 235 | 130 |  | 130 | 130 |  |
|  |  |  |  |  |  |  |
| $HCO_3$ as $CaCO_3$ | 120 | 15 |  | 0 | 0 |  |
| $CO_3$ " " | 0 | 0 |  | 20 | 20 |  |
| OH " " | 0 | 0 |  | 100 | 5 |  |
| $SO_4$ " " | 88 | 88 |  | 0 | 95 |  |
| Cl " " | 27 | 27 |  | 10 | 10 |  |
| Total anions | 235 | 130 |  | 130 | 130 |  |
|  |  |  |  |  |  |  |
| Total hardness | 204 | 0-2 | 0-2 | 0-2 | 0-2 | 0 |
| M. O. alkalinity | 120 | 15 | 15 | 120 | 25 | 250 |
| Silica | 40 | 40 | 40 | 5 | 5 | 50 |
| $CO_2$ as $CO_2$ | 0 | 93 | 5 | 0 | 0 | — |
| Total solids | - | - | - | - | 180 | 1800 |

INVENTOR.
SAMUEL B. APPLEBAUM
BY
ATTORNEYS

CAUSTIC SODA REGENERANT LEVEL VS. CAPACITY AND EFFLUENT SILICA

United States Patent Office 2,807,582
Patented Sept. 24, 1957

2,807,582

METHOD AND APPARATUS FOR WATER TREATMENT

Samuel B. Applebaum, Meadowbrook, Pa., assignor to Cochrane Corporation, Philadelphia, Pa., a corporation of Pennsylvania Application April 5, 1954, Serial No. 420,900

7 Claims. (Cl. 210—26)

This invention relates to the treatment of water and particularly to the removal of silica.

The primary object of this invention is to provide a method and apparatus for the treatment of water for boiler feed purposes which accomplishes the complete removal of the hardness of the water together with a partial reduction of the alkalinity and silica content of the water so that the final effluent will have a zero hardness, an alkalinity not greater than about 20% of the total dissolved solids and a silica content sufficiently low so that when concentrated in a boiler, it will be below that amount which would cause silica deposits in steam turbines using the steam from the boilers, and which involves a relatively small operating and investment cost in comparison with the operating and investment costs involved in presently employed methods and apparatus for the treatment of boiler feed water.

In the treatment of boiler feed water for high pressure boilers it is important to reduce the hardness to a minimum to prevent scale, to reduce the bicarbonate or carbonate alkalinity to a minimum to reduce the carbon dioxide content in the steam to prevent condensate system corrosion and to prevent carryover from the boiler, and also to reduce silica to prevent silica scale in the boiler and particularly to prevent silica deposits in steam turbines. Silica deposit in steam turbines has become a very important problem in the operation of power plants because such deposits reduce the efficiency of the turbines and make it necessary to shut the turbines down for cleaning. Such shutdowns are expensive because the power plant loses its capacity at that time in the absence of adequate spare units. Prevention of silica deposits in the turbines can only be accomplished by reducing the amount of silica in the steam which feeds the turbines. This in turn requires the maintenance of low concentrations of silica in the concentrated boiler salines inasmuch as silica in the steam is a direct function of silica in the boiler salines. Such low concentrations can be partly attained by increased boiler blowoff. But in many cases the make-up feedwater may contain such high amounts of silica that the blowoff becomes excessive. Then treating the feedwater to reduce its silica becomes essential.

The two methods of silica removal that have gained general acceptance in recent years are demineralization or deionization and hot lime zeolite treatment. The former in addition to removing silica removes the other dissolved solids so that it produces a water as low in electrolyte as distilled water. It is, therefore, rapidly being adopted instead of evaporators in the public utility field where the percent make-up is usually low and the boiler pressure in the newer plants exceeds about 1000 p. s. i. g. In the industrial field for boiler pressures of between 500 and 1000 p. s. i. g. the second method, hot lime zeolite, is usually preferred due to its lower first and operating cost.

Demineralization is a two-step process. The first step consists of a cation exchange in the acid cycle which converts the salts to their corresponding acids. The second step is an anion exchange which adsorbs these acids. Silica is likewise converted to silicic acid by the cation exchanger and is adsorbed by the anion exchanger. The cation exchanger is regenerated with acid and the anion exchanger is regenerated with caustic soda. However, the amount of caustic soda required for complete demineralization usually runs to more than 4 to 6 lbs. of caustic soda per cu. ft. of anion exchange resin which makes the operating cost high. Demineralization reduces the total electrolyte down to under 2 p. p. m. and reduces the silica down to about 0.1 to 0.2 p. p. m.

In hot lime zeolite plants the water is treated with lime at boiling temperatures which precipitates the carbonate hardness and also reduces silica by adsorption on magnesium precipitates in the hot process settling tank and in the filters which follow the tank. The hot zeolite units which follow the filters remove the residual hardness and the resulting effluent is a water of hardness approaching zero and an alkalinity approaching 25 p. p. m. as $CaCO_3$ and a silica down to about 1 to 2 p. p. m. as $SiO_2$. The operating cost for hot lime zeolite plants is usually much lower than for demineralizing.

The investment on an erected basis of apparatus for these first two methods, demineralization and hot lime zeolite, is high. This is true in the case of demineralization because all the shells and piping must be rubber lined to withstand the acidity of the liquid involved in the process. In the case of hot lime zeolite the investment is high because the settling tanks have to be welded up in the field and then covered with insulation to avoid heat losses and large steam mains are involved to bring the water to the boiling point in the settling tank. The large space required for a hot lime zeolite plant is also to be considered because in many plants space is scarce.

The new method and equipment that are described herein provide a third alternative method to demineralization and hot lime zeolite with a lower operating cost than demineralizing and a lower investment cost than both methods. It consists of the following steps:

The water is first passed through a cold process split stream hydrogen-sodium zeolite plant which reduces the hardness to practically zero, reduces the alkalinity to about 15 p. p. m., converting the alkalinity to free carbon dioxide. It does not remove the silica.

The hydrogen zeolite, which is an acid regenerated cation exchanger, not only removes the hardness but also converts all the salts to their respective acids. Therefore, if hydrogen zeolite alone were used the effluent would be acid which is unsuitable for boiler feed purposes. The function of the sodium zeolite unit which operates in parallel with the hydrogen zeolite is to furnish an effluent high in sodium bicarbonate. The hydrogen zeolite and the sodium zeolite effluents are blended in such ratio that the sodium bicarbonate in the effluent of the sodium zeolite unit is sufficient to neutralize the acidity of the hydrogen zeolite effluent. The resulting blended effluent, therefore, is substantially free from acid except for free carbon dioxide and is substantially free from hardness.

The effluent of this split stream hydrogen-sodium zeolite plant then is passed through a degasifier or decarbonator which usually consists of a wood vessel in which are contained wood trays or Raschig rings or similar fill. The water trickles down over these trays or Raschig rings so as to be subdivided in thin films or droplets. Low pressure air is blown upwardly through this decarbonator counterflow to the downward passage of the trickling water and this air acting on the films removes the free carbon dioxide in the water. The gas is vented at the top of the decarbonator to the atmosphere. The decarbonator does not change the chemical analysis otherwise, leaving the zero hardness and the 15 p. p. m. of alkalinity aforementioned but reduces the dissolved free carbon dioxide content of the water down to about 5 p. p. m.

The decarbonator effluent is then pumped through the anion exchange units. These units contain a strongly basic Type I anion resin capable of splitting salts. The following chemical reaction is typical.

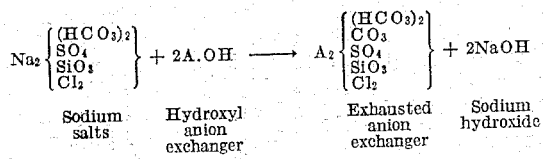

$$\text{Na}_2\begin{Bmatrix}(\text{HCO}_3)_2\\ \text{SO}_4\\ \text{SiO}_3\\ \text{Cl}_2\end{Bmatrix} + 2\text{A.OH} \longrightarrow \text{A}_2\begin{Bmatrix}(\text{HCO}_3)_2\\ \text{CO}_3\\ \text{SO}_4\\ \text{SiO}_3\\ \text{Cl}_2\end{Bmatrix} + 2\text{NaOH}$$

Sodium salts    Hydroxyl anion exchanger    Exhausted anion exchanger    Sodium hydroxide Thus all the sodium salts present in the decarbonated effluent are converted almost entirely to sodium hydroxide except for a little leakage of chlorides or carbonates. The effluent would, therefore, consist mainly of sodium hydroxide together with a small amount of sodium carbonate and sodium chloride. The silica is likewise reduced. The anion resin is regenerated with caustic soda but the amount of caustic soda that it has been found possible to use is about 1.25 to 1.5 lbs. per cu. ft. of resin in order to reduce the silica down to about 5 p. p. m. The shells and piping are not rubber lined because no acid liquids are present. Thus the investment is reduced.

The anion exchanger effluent is too high in sodium hydroxide content to be used for boiler feed purposes because it would cause carryover from the boilers. The usual ratio of alkalinity to total solids to prevent carryover is about 10 to 20%. Therefore, the last step in this process is to feed sulphuric acid into the effluent of the anion exchanger which converts a part of the sodium hydroxide to sodium sulfate so that the final effluent will have a ratio of alkalinity to total solids of less than 20%.

The objects of the invention relate to the attainment of the foregoing results and will be clear from the following description read in conjunction with the accompanying drawings, in which.

The apparatus involved may be briefly described with reference to Figure 1. The raw well water enters at 10 and is split into two streams, with proportioning, which respectively pass into the hydrogen zeolite exchanger 12 and the sodium zeolite exchanger 14. For raw water having the analysis given in column (1) of Figure 3, the proportioning would be 48% through exchanger 12 and 52% through exchanger 14. The proportioning is, of course, dependent upon the raw water analysis and is so carried out that the combined effluent analysis approaches neutrality, for example, having an alkalinity (methyl orange) of 15 p. p. m. The proportioning required is, of course, readily determinable from the raw water analysis and the percentages given are merely typical and would apply to the analysis given. The neutralization provides that the remaining carbonic acid content is at least to a major extent in the form of free carbon dioxide. Exchanger 12 is regenerated with sulphuric acid; exchanger 14 with sodium chloride.

Figures 1, 3:
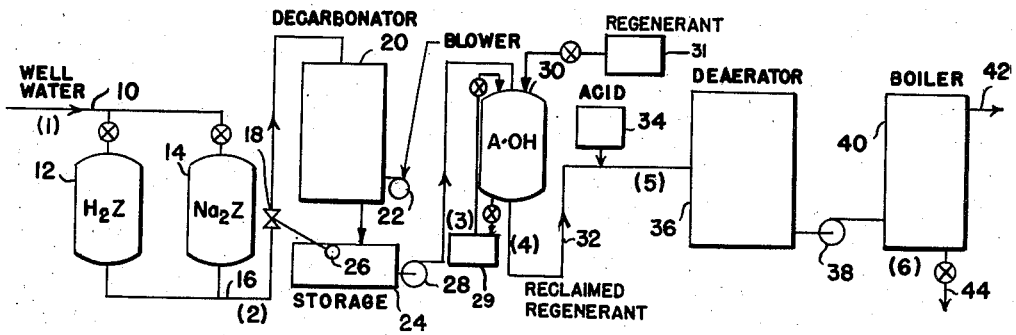
Figure 1 is a flow diagram illustrating the apparatus for carrying out the steps outlined above.
Figure 3 is a table showing analyses at various points of the process, the columns (1) to (6), inclusive, corresponding to the points so designated in Figure 1, the figures therein being in p. p. m.

The effluents from exchangers 12 and 14 are combined at 16 and would then have the analysis given in column (2) of Figure 3. The combined effluent then passes through float-controlled valve 18 to the decarbonator 20 which has the form previously described, air being blown thereinto by blower 22, and the decarbonated water flowing into the storage tank 24 in which there is located the float 26 controlling the valve 18 and serving to maintain a definite level in the tank. A pump 28 delivers the water, having the analysis given in column (3) of Figure 3, from the storage tank to the salt-splitting exchanger 30 containing the anion resin indicated at A·OH which effects the exchange reaction given above. Regeneration of this exchanger is effected by caustic soda.

The analysis of the water leaving the exchanger 30 is given in column (4) of Figure 3. The effluent passing through conduit 32 is partially neutralized by acid (most inexpensively H₂SO₄) fed from the acid supply tank 34. Following this partial neutralization the analysis is as given in column (5) of Figure 3.

The water then passes to the deaerator 36 where heating to remove air takes place in conventional fashion, and is delivered to the boiler 40 by feed pump 38. 42 indicates the steam exit of the boiler and 44 the boiler blow off.

Column (6) in Figure 3 shows the analysis of accepted allowable limits in the concentrated boiler saline for a boiler pressure of 500 to 700 p. s. i. The hardness is zero to prevent boiler scale. The alkalinity is limited to 250 p. p. m. to avoid carryover and the ratio of alkalinity to total solids is under 20% for the reasons above given. The silica is limited to 50 p. p. m. which has been found low enough in many cases to avoid turbine deposits when the boiler pressure is under about 700 p. s. i. Column (6) as compared with column (5) shows that the various constituents will be concentrated about ten times. This means that the boilers will be blown off by an amount which is one-tenth of the make-up water. It is, of course, possible to keep the concentration of silica low in the boiler by increasing the boiler blowoff but, as stated earlier, this makes the amount of blowoff excessive. Blowoff of 10% of the make-up is considered acceptable.

With 50 p. p. m. of allowable silica in the boiler salines and with ten concentrations it is, therefore, feasible to aim at an average silica in the treated effluent of about 5 p. p. m.

Figure 2:
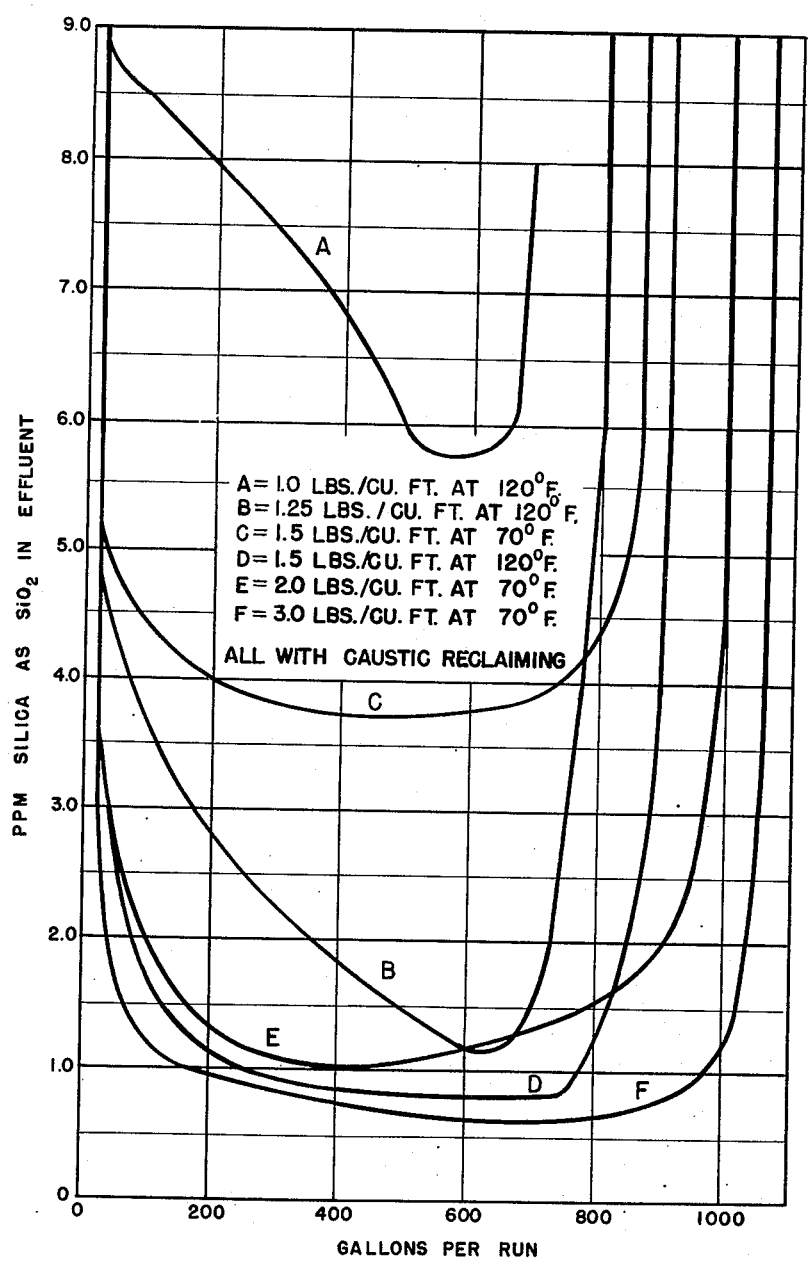
Figure 2 is a graph illustrating typical effluent silica content plotted against gallons per run for various caustic soda regenerant levels involving caustic reclaiming.

The amount of silica which is present in the effluent of an anion exchanger is influenced by the amount of caustic soda used in the regeneration of the anion resin in exchanger 30 and its temperature. Figure 2 shows the relationship between the caustic soda regenerant level and temperatures and the effluent silica. It is to be noted that when the amount of caustic is only 1.0 lb. per cu. ft. the silica in the effluent is above 5 p. p. m. on the average and would, therefore, be too high to satisfy the requirements in this example. By increasing the regenerant level to 1.25 or 1.5 lbs. the silica in the effluent is depressed to under 5 p. p. m. as desired. The curves also show the effect of using 120° temperature for the caustic soda as compared to 70° temperature. The warmer temperature is desirable to accomplish the most efficient regeneration.

For typical operation, still considering the raw water analysis of column (1), Figure 3, there would be required, per 1000 gallons of water, about 2.1 pounds of sulphuric acid required for regeneration of exchanger 12, about 2.8 pounds of sodium chloride for regenration of exchanger 14, about 2.3 pounds of caustic soda for regeneration of exchanger 30, and about 0.9 pound of sulphuric acid for neutralization at 34. At present prices this would involve a cost for these chemicals, per 1000 gallons of water, of 3.3 cents for the acid, 2.8 cents for the salt, and 9.2 cents for the caustic soda.

From this it will be noted that the main item is the caustic soda for the regeneration of the anion exchanger. Therefore, it is important to keep this caustic soda regenerant level at a minimum. On an equivalent basis the amount of caustic soda used is greater than the amount of anions removed from the resin during the regeneration, the excess being required for completing the regeneration reaction. However, part of this excess of caustic soda can be reclaimed by providing a tank 29 into which part of the effluent during regeneration is passed. Then this reclaimed caustic may be utilized for the first part of a succeeding regeneration, following it by the use of fresh caustic soda solution as a final step in the regeneration delivered from a tank 31. The curves in Fig. 2 are based on such reclaiming of caustic soda.

It would be possible to precede the anion exchanger by a sodium zeolite plant instead of the combined hydrogen-sodium zeolite plant plus the decarbonator. But this sodium zeolite would convert the calcium and magnesium salts to their corresponding sodium salts and leave all the anions unchanged. The water would have the same low hardness but the alkalinity would in the example in Table 1 by 120 p. p. m. instead of 15 p. p. m. The total cations or the total anions after such sodium zeolite treatment would be approximately the same as in the raw water, namely, about 235 p. p. m. and the silica would likewise be 40 p. p. m. Then when this sodium zeolite effluent was passed through the anion exchanger the latter would convert practically all the anions to sodium hydroxide as in the previous example and would reduce the silica from 40 down to 5 p. p. m. but it would have roughly about twice as much work to do because the total anions would be 235 p. p. m. as compared to 130 p. p. m. in the effluent of the hydrogen-sodium split stream treatment given in Table 1. Therefore, the amount of anion resin required and the amount of caustic soda required would be approximately doubled. Also the amount of alkalinity in the anion exchanger effluent would likewise be doubled or about 240 p. p. m. instead of 120 p. p. m. because twice as many anions are converted to hydroxide. Consequently the final acid treatment would require approximately twice as much acid to reduce this higher alkalinity down to 25 p. p. m.

The total solids after addition of the final acid would likewise be twice as great in the case of the sodium zeolite pretreatment than in the case of hydrogen-sodium pretreatment. The blowoff would, therefore, be approximately twice as great. Instead of blowing off only 10% of the make-up the blowoff would be about 17 to 20% to maintain the same final concentrations of impurities in the boiler.

The hydrogen-sodium zeolite pretreatment by reducing the alkalinity in addition to reducing hardness therefore makes the anion exchanger process economical. With sodium zeolite as the pretreatment, bicarbonate alkalinity is not reduced and this bicarbonate must be converted to hydroxide by the anion exchange step. The cost of doing this is high because caustic soda used in the regeneration of the anion unit is expensive.

The advantages of this new combination of hydrogen-sodium zeolite plus a decarbonator with the anion exchanger and final acid feed consists therefore in:

(a) The saving of caustic soda in the regeneration of the anion exchanger.

(b) The reduction in the size and investment required for the anion exchange plant.

(c) The reduction in the amount of final acid used and the reduction in the final total solids in the treated water.

(d) Reduction in boiler blowoff required.

It will be evident that various changes may be made in the exchanger materials used, various materials being available to perform the same or similar functions. Likewise the regenerant and neutralizing materials may be of various types, though considerations of economy generally point to sodium chloride as a regenerating salt, caustic soda for anion exchanger regenerant, and sulphuric acid as the acid zeolite regenerant and neutralizer.

What is claimed is:

1. A method of treating water to reduce its silica content and its possible content of constituents of the group calcium, magnesium, and carbonic acid comprising splitting the water to be treated into two streams, passing one of said streams in ion exchange contact with a sodium zeolite to replace any calcium and magnesium salts therein at least in part by sodium salts, passing the other of said streams in ion exchange contact with a hydrogen zeolite to replace any calcium and magnesium salts therein at least in part by the acids thereof, blending the effluent from said zeolites into a combined effluent, said splitting of the water being controlled to provide streams related as to relative proportions in view of the water composition so that said combined effluent is approximately neutral with the original carbonic acid content largely present as free carbon dioxide, removing the free carbon dioxide from said combined effluent, and then passing the combined effluent in ion exchange contact with an hydroxyl anion exchanger to convert anions in the combined effluent, including silica, at least in part into sodium hydroxide in the water.

2. A method according to claim 1 in which the final sodium hydroxide content of the water is at least partially neutralized.

3. A method according to claim 1 in which the final sodium hydroxide content of the water is at least partially neutralized to provide a final ratio of alkalinity to total solids of less than 20%.

4. A method according to claim 1 in which the hydroxyl ion exchanger is regenerated by hot sodium hydroxide.

5. A method according to claim 4 in which the effluent containing excess sodium hydroxide from one regeneration of the hydroxyl ion exchanger is used in the first part of a succeeding regeneration thereof.

6. In apparatus for treating water to reduce its silica content and its possible content of constituents of the group calcium, magnesium, and carbonic acid comprising a first ion exchange unit containing sodium zeolite, a second ion exchange unit containing hydrogen zeolite, means for directing into said units proportioned quantities of water undergoing treatment, and means for combining the effluents from said units, the improvement comprising means for removing free carbon dioxide from the combined effluent, a third ion exchange unit containing an hydroxyl ion exchanger, and means for directing the decarbonated effluent to said third unit.

7. In apparatus for treating water to reduce its silica content and its possible content of constituents of the group calcium, magnesium, and carbonic acid comprising a first ion exchange unit containing sodium zeolite, a second ion exchange unit containing hydrogen zeolite, means for directing into said units proportioned quantities of water undergoing treatment, and means for combining the effluents from said units, the improvements comprising means for removing free carbon dioxide from the combined effluent, a third ion exchange unit containing an hydroxyl ion exchanger, means for directing the decarbonated effluent to said third unit, and means supplying acid to the effluent from said third unit.

References Cited in the file of this patent

UNITED STATES PATENTS

| | | |
|---|---|---|
| 1,510,469 | Duggan | Oct. 7, 1924 |
| 1,693,065 | White | Nov. 27, 1928 |
| 2,226,743 | Riley | Dec. 31, 1940 |
| 2,287,284 | Behrman | June 23, 1942 |

(Other references on following page)

FOREIGN PATENTS 688,051    Great Britain ---------- Feb. 25, 1953

OTHER REFERENCES

Chem. Eng. Progress, vol. 44, No. 4, April 1948, pp. 269–274.

Power, vol. 91, No. 8, December 1947, pp. 75 and 76.

Ind. & Eng. Chem., vol. 43, No. 5, May 1951, pp. 1076–1078.

Journal Am. Water Works Association, vol. 44, No. 11, November 1952, pp. 1057–1064.